US012741615B2

(12) United States Patent
Fiebrandt et al.

(10) Patent No.: US 12,741,615 B2
(45) Date of Patent: Sep. 22, 2026

(54) METHOD FOR OPERATING A CLEANING SYSTEM, CLEANING SYSTEM

(71) Applicant: ZF CV Systems Global GmbH, Bern (CH)

(72) Inventors: Jan Fiebrandt, Hannover (DE); Janik Ricke, Uetze (DE)

(73) Assignee: ZF CV Systems Global GmbH, Bern (CH)

( * ) Notice: Subject to any disclaimer, the term of this patent is extended or adjusted under 35 U.S.C. 154(b) by 117 days.

(21) Appl. No.: 17/822,050

(22) Filed: Aug. 24, 2022

(65) Prior Publication Data

US 2022/0402463 A1 Dec. 22, 2022

Related U.S. Application Data

(63) Continuation of application No. PCT/EP2021/052345, filed on Feb. 2, 2021.

(30) Foreign Application Priority Data

Feb. 25, 2020 (DE) .................... 10 2020 104 875.0

(51) Int. Cl.
*B60S 1/56* (2006.01)
*B60S 1/48* (2006.01)
(Continued)

(52) U.S. Cl.
CPC . *B60S 1/56* (2013.01); *B60S 1/48* (2013.01); *B60S 1/54* (2013.01); *G02B 27/0006* (2013.01)

(58) Field of Classification Search
None
See application file for complete search history.

(56) References Cited

U.S. PATENT DOCUMENTS

2013/0092758 A1 4/2013 Tanaka et al.
2015/0203076 A1* 7/2015 Irie .................... G02B 27/0006 15/319

(Continued)

FOREIGN PATENT DOCUMENTS

CN 109177929 A 1/2019
DE 10 2012 218 583 A1 4/2013

(Continued)

OTHER PUBLICATIONS

Translation of the Written Opinion of the International Searching Authority dated Apr. 26, 2021 for international application PCT/EP2021/052345 on which this application is based.

(Continued)

*Primary Examiner* — Omair Chaudhri
(74) *Attorney, Agent, or Firm* — Walter Ottesen, P.A.

(57) ABSTRACT

The disclosure relates to a method for operating a cleaning system for cleaning a sensor surface of a sensor of a vehicle, in particular an optical sensor, having the step: applying an amount of compressed air to the sensor surface in an air cleaning step characterized by: checking an air cleaning result in a checking step; in the event of a negative air cleaning result, performing a hybrid cleaning step including: applying an amount of cleaning fluid to the sensor surface in a fluid, in particular liquid, cleaning step; and/or, applying an amount of compressed air to the sensor surface in a further air cleaning step.

24 Claims, 6 Drawing Sheets

(51) Int. Cl.
*B60S 1/54* (2006.01)
*G02B 27/00* (2006.01)

(56) References Cited

U.S. PATENT DOCUMENTS

| | | | | |
|---|---|---|---|---|
| 2015/0329083 | A1* | 11/2015 | Kiyohara | B60S 1/0848 348/148 |
| 2016/0272165 | A1* | 9/2016 | Hsiao | G02B 27/0006 |
| 2018/0201231 | A1* | 7/2018 | Tani | G02B 27/0006 |
| 2018/0354468 | A1* | 12/2018 | Krishnan | B60S 1/56 |
| 2018/0354469 | A1 | 12/2018 | Krishnan | |
| 2019/0077376 | A1* | 3/2019 | Baldovino | B60S 1/52 |
| 2019/0077377 | A1 | 3/2019 | Schmidt | |
| 2019/0106085 | A1* | 4/2019 | Bacchus | G02B 27/0006 |
| 2019/0265715 | A1 | 8/2019 | Ghannam et al. | |
| 2019/0275991 | A1 | 9/2019 | Schmidt | |
| 2019/0322245 | A1* | 10/2019 | Kline | B60S 1/0848 |
| 2019/0337489 | A1 | 11/2019 | Baldovino et al. | |
| 2020/0139941 | A1* | 5/2020 | Jansson | B60S 1/50 |
| 2020/0180569 | A1 | 6/2020 | Seo | |
| 2020/0282416 | A1 | 9/2020 | Fiebrandt et al. | |
| 2020/0391702 | A1* | 12/2020 | Yamauchi | B60Q 9/00 |
| 2021/0009088 | A1* | 1/2021 | Hayashi | B08B 3/02 |
| 2021/0031727 | A1* | 2/2021 | Sakai | B60S 1/481 |
| 2021/0109345 | A1* | 4/2021 | Robertson, Jr. | G01S 7/4043 |
| 2021/0253068 | A1 | 8/2021 | Baudouin et al. | |

FOREIGN PATENT DOCUMENTS

| | | | |
|---|---|---|---|
| DE | 10 2018 113 386 | A1 | 12/2018 |
| DE | 10 2018 121 812 | A1 | 3/2019 |
| DE | 10 2018 122 315 | A1 | 3/2019 |
| DE | 10 2017 010 254 | A1 | 5/2019 |
| DE | 10 2019 104 862 | A1 | 8/2019 |
| DE | 10 2019 105 553 | A1 | 9/2019 |
| DE | 10 2019 111 372 | A1 | 11/2019 |
| DE | 10 2019 215 017 | A1 | 6/2020 |
| EP | 2 873 572 | A1 | 5/2015 |
| EP | 3 168 094 | A1 | 5/2017 |
| WO | 2019/238764 | A1 | 12/2019 |

OTHER PUBLICATIONS

International Search Report of the European Patent Office dated Apr. 26, 2021 for international application PCT/EP2021/052345 on which this application is based.
English translation and Office Action of the Chinese Patent Office dated Jul. 31, 2025 in corresponding Chinese patent application No. 202180013779.9.

* cited by examiner

METHOD FOR OPERATING A CLEANING SYSTEM, CLEANING SYSTEM

CROSS REFERENCE TO RELATED APPLICATIONS

This application is a continuation application of international patent application PCT/EP2021/052345, filed Feb. 2, 2021 designating the United States and claiming priority from German application 10 2020 104 875.0, filed Feb. 25, 2020, and the entire content of both applications is incorporated herein by reference.

TECHNICAL FIELD

The disclosure relates in a first aspect to a method for operating a cleaning system. The disclosure relates in a second aspect to a cleaning system. The disclosure relates in a third aspect to a vehicle.

BACKGROUND

Cleaning systems and methods for cleaning sensor surfaces and similar surfaces, especially in the field of vehicles, are well known.

US 2020/0282416 describes a cleaning device for selectively applying a sequence of media consisting of at least one first, in particular gaseous, medium and a second, in particular liquid, medium to a surface, having: a nozzle configured for subjecting the surface to the second medium, a cleaning valve with a holding port, a pressure port, a ram and a pressure outlet.

In addition to this fundamentally advantageous approach, the use of a liquid medium for cleaning leads to the problem that a sufficiently large storage tank must be provided for regular use of the cleaning device. This creates a target size conflict due to the installation space and weight restrictions that prevail, especially for vehicles. Also, when cleaning with a liquid medium, the measurement signal of the sensor, in particular a camera image, is usually impaired for a short period of time.

US 2013/0092758 describes a camera washing device with an air pump, a washing water tank that stores washing water, a spray nozzle with a spray section, a merging connector having a high-pressure air passage and a washing water passage, and an electromagnetic valve. The air pump generates and supplies high-pressure air to the high-pressure air passage. When the control unit instructs the electromagnetic valve so that it is switched to an open state, the washing water and high-pressure air are mixed in the merging connector to generate water particles. The generated water particles are fed to the spray nozzle.

EP 2 873 572 A1 discloses a cleaning device for a vehicle-mounted camera which cleans a light disc surface mounted on a vehicle, the cleaning device including; a nozzle which has a discharge opening from which a cleaning liquid and compressed air are output, and which is positioned so that it is facing the light disc surface, and a cleaning liquid path which leads the cleaning liquid to the discharge opening, and has an air passage configured to direct the compressed air to the discharge opening in which a distant end section of the cleaning liquid path and a distant end section of the air passage are positioned so that they are adjacent to each other or so that they are combined with each other; a cleaning liquid supply section, which feeds the cleaning liquid through a cleaning liquid line to the nozzle; wherein the control section performs cleaning with a continuous water supply mode, in which the cleaning liquid supply section is driven, and the compressed air supply section is driven in bursts for a plurality of times to eject the cleaning liquid and the compressed air jet from the discharge opening, whereby the cleaning liquid is dripped onto the light disc surface.

With the above approaches, the problem of water-saving cleaning is already generally recognized and is taken into account in US 2013/0092758 by mixing air into a water jet and in EP 2 873 572 A1 by the generation of a water mist.

Furthermore, EP 3 168 094 A1 describes a system for cleaning an external sensor surface mounted on the vehicle, which has: an air nozzle, which is configured to output air to a sensor surface; an air pump having a fluid inlet, an air outlet, an air-fluid interface and a variable volume compression chamber that communicates with the air outlet; wherein it further has: an air flow control device that communicates with the air nozzle and the air outlet to control the air flow; and a liquid pump that communicates with the fluid inlet to provide a flow of liquid under pressure so that the volume of the compression chamber changes to produce a volume of compressed air with an absolute pressure below 10 bar.

In the approach described in EP 3 168 094 A1, the liquid consumption is also addressed and the possibility of different cleaning cycles is generally described.

However, it is still problematic to enable effective cleaning with as little liquid consumption as possible. It would be desirable to specify a cleaning method that improves at least one of the disadvantages present in the prior art.

SUMMARY

It is an object of the disclosure to specify a method in an improved manner, and in particular enables effective cleaning of a sensor surface with the lowest possible liquid consumption.

The aforementioned object concerning the method, can, for example, be achieved by a method for operating a cleaning system for cleaning a sensor surface of a sensor of a vehicle. The method includes: applying an amount of compressed air to the sensor surface in an air cleaning step; checking an air cleaning result in a checking step; and, performing a hybrid cleaning step in an event of a negative air cleaning result, wherein said hybrid cleaning step includes at least one of: applying an amount of cleaning fluid to the sensor surface in a fluid cleaning step, and, applying an amount of compressed air to the sensor surface in a further air cleaning step.

The disclosure is based on a method for operating a cleaning system for cleaning a sensor surface of a sensor of a vehicle, in particular an optical sensor, having the step:

- applying an amount of compressed air to the sensor surface in an air cleaning step.

According to the disclosure, the method provides for the checking of an air cleaning result in a checking step, wherein in the event of a negative air cleaning result the performance of a hybrid cleaning step takes place, including:

- applying an amount of cleaning fluid to the sensor surface in a fluid, in particular liquid, cleaning step and/or
- applying an amount of compressed air to the sensor surface in a further air cleaning step.

The disclosure is at least in part based on the consideration that a saving of liquid, in particular of a cleaning fluid, especially with vehicles, is generally advantageous. The disclosure includes the finding that cleaning via air, in particular compressed air, is generally preferable to liquid cleaning, because in an air cleaning step no cleaning fluid is consumed and the impairment of the sensor signal, in particular a camera image, during cleaning is less than with a fluid, in particular a liquid cleaning step. The disclosure has recognized that, however, in the event of greater soiling, cleaning only by air cannot be sufficient. A cleaning fluid is in particular a cleaning liquid, but can also be in the form, for example, of a gas-water mixture in the form of a spray mist. A cleaning fluid may in particular contain an antifreeze.

The disclosure has recognized that it is advantageous to control the cleaning method depending on a cleaning result, that is, depending on a checking step, in order in this way to use a cleaning fluid the amount of which is limited on board a vehicle—sparingly, in particular only if cleaning with compressed air is not successful.

By checking the air cleaning result following applying a compressed air pulse to the sensor surface and wherein a hybrid cleaning step takes place only in the event of a negative air cleaning result, needs-based cleaning of the sensor surface is advantageously made possible. Only if the air cleaning result is negative, that is, if applying only a compressed air pulse to the sensor surface has not led to sufficient cleaning, further cleaning takes place in a hybrid cleaning step, which includes applying a cleaning fluid and and/or to a compressed air pulse to the sensor surface.

In this way, the cleaning fluid—present only to a limited extent—is used economically and at the same time effective cleaning of the sensor surface is ensured.

The checking of a cleaning result, in particular the air cleaning result, in a checking step can be performed in particular by receiving a cleaning signal, which indicates whether cleaning is necessary due to existing soiling of the sensor.

The fluid cleaning step does not necessarily have to include exclusively applying liquid, but in embodiments may include that the amount of cleaning fluid is a cleaning mixture, in particular a spray mist, which contains a cleaning fluid and air, which is mixed, in particular before the cleaning mixture is directed to the sensor surface.

The disclosure leads in a second aspect to a cleaning system for cleaning a sensor surface of a sensor, in particular an optical sensor, in a vehicle, having a cleaning device and a control unit, configured to perform a method according to the first aspect of the disclosure, in particular, the cleaning system is connected to a vehicle bus and/or another communication line of the vehicle in a signal transferring manner for receiving and/or sending information regarding the cleaning method.

The disclosure leads in a third aspect to a vehicle with a cleaning system according to the second aspect of the disclosure.

In particular, it is provided that applying compressed air to the sensor surface in the further air cleaning step is performed after the fluid, in particular the liquid, cleaning step. In such a sequence, the sensor surface can be effectively cleaned in the hybrid cleaning step, in particular by first softening the soiling by a cleaning fluid, and then removing the softened soiling residues by the amount of compressed air.

In particular, it is provided that the fluid, in particular liquid, cleaning steps performed are recorded, in particular

- a number of cycles of fluid, in particular liquid, cleaning steps performed is recorded, which is increased after each fluid, in particular liquid, cleaning step. The recording of a number of cycles advantageously enables the control of the method, in particular the determination of a residual number of cycles and/or a total number of cycles to determine a remaining service life.

In particular, it is envisaged that:

- the amount of cleaning fluid depends on a number of cycles in such a way that
- a larger number of cycles leads to a greater amount of cleaning fluid, wherein in particular
- the amount of cleaning fluid is increased up to a maximum amount of cleaning fluid.

The recording of the number of cycles within a performance of the method allows the adjustment of an amount of cleaning fluid depending on the already completed fluid, in particular liquid, cleaning steps. According to the concept of the disclosure, such an adjustment of the amount of cleaning fluid can first be used to attempt to achieve cleaning of the sensor surface with a starting amount of cleaning fluid with as little cleaning fluid as possible, in order only if this is unsuccessful to then increase the amount of cleaning fluid to improve the cleaning effect, in particular gradually up to a maximum amount of cleaning fluid. The increase can be linear, that is, by a constant amount for each cycle, or nonlinear, for example by doubling for each cycle. An increase, in particular a linear increase, in the amount of cleaning fluid can be performed, for example, in steps of between 2 ml and 20 ml. A maximum amount of cleaning fluid may, for example, be between 25 ml and 100 ml, preferably 40 ml. A starting amount of cleaning fluid may be in particular between 2 ml and 20 ml, preferably between 3 and 8 ml. When choosing the amounts of cleaning fluid, the size of the surface to be cleaned can be taken into account in particular, in such a way that a larger area requires a greater amount of cleaning fluid.

By recording the number of cycles, a total number of cycles can be determined for recording the number of all fluid, in particular liquid, cleaning steps since the last filling of the fluid tank, whereby advantageously the consumption of the cleaning fluid and in particular a residual amount of fluid still present in the fluid tank can be recorded.

Alternatively or additionally, a residual number of cycles can be determined, which is determined on the basis of a residual amount of fluid present in the fluid tank and a required amount of cleaning fluid, in particular estimated or averaged over several process sequences. Based on the predicted number of residual cycles, it can be determined how many processes can still be performed with the existing residual amount of fluid. To determine the level, the fluid tank may have a level sensor.

In particular, it is provided that the amount of compressed air depends on the number of cycles in such a way that a larger number of cycles leads to a greater amount of compressed air, wherein the amount of compressed air s increased up to a maximum amount of compressed air. Analogous to the embodiment of the method, in which the amount of cleaning fluid depends on the number of cycles, the advantage can be achieved in this embodiment that first an attempt is made to achieve cleaning of the sensor surface with a relatively small amount of compressed air, namely a starting amount of compressed air. Only if this is not successful is the amount of compressed air increased up to the maximum amount of compressed air. When increasing the amount of compressed air, in particular, a residual amount of compressed air plays a subordinate role, since compressed air can usually be generated by a compressor available on board the vehicle and can be provided when necessary and/or can be stored by means of a compressed air storage tank. Thus, an amount of compressed air, in particular a starting and/or maximum amount of compressed air, can be selected freely and in particular selected exclusively according to aspects of a maximum cleaning performance. In particular, an amount of compressed air greater than an amount of cleaning fluid can be selected.

In an advantageous embodiment, both previous embodiments can be combined, in such a way that depending on the number of cycles, the amount of cleaning fluid and the amount of compressed air together are increased. By such a joint increase of the amount of cleaning fluid and the amount of compressed air depending on the number of cycles, the total cleaning performance per cleaning cycle can be advantageously increased. Such an embodiment of the method can be advantageously implemented with a piston unit in which the amount of compressed air in an air chamber due to the displacing movement of a pressure ram also corresponds to an amount of cleaning fluid in a fluid chamber.

In particular, the starting amount of compressed air may be identical to the starting amount of cleaning fluid and/or the maximum amount of compressed air may be identical to the maximum amount of cleaning fluid and/or a respective increase in the amount of compressed air depending on the number of cycles may be identical to the corresponding increase in the amount of cleaning fluid.

Advantageously, it is provided that the sequence of steps after the hybrid cleaning step also has the step: checking the hybrid cleaning result in a further checking step, wherein the sequence of steps is repeated until a termination condition is reached.

In such an embodiment of the method, the course of the method can be advantageously terminated by a termination condition, so that an endless repetition of the cleaning steps is avoided.

The disclosure is developed in that the termination condition is achieved if the hybrid cleaning result is positive as the first termination condition or the number of cycles has reached a maximum value as the second termination condition. In such an embodiment, the method is terminated by the first termination condition if the sensor surface is successfully cleaned. In the event of unsuccessful cleaning, after a maximum value of the number of cycles has been reached, the method is terminated by a second termination condition in order to advantageously save cleaning fluid. The second termination condition is therefore particularly useful if the soiling is so stubborn that it cannot be removed by the cleaning system. In this case, a warning signal may be issued that cleaning the sensor was unsuccessful.

In particular, it is provided that the checking step for checking the air cleaning result and/or the further checking step for checking the hybrid cleaning result is performed by means of the sensor, in particular the optical sensor, and/or its evaluation device. By checking the cleaning result by means of the sensor to be cleaned itself, further sensors can be advantageously dispensed with.

Advantageously, it is provided that the checking step or the further checking step is performed during the air cleaning step or the further air cleaning step or within a waiting period after the air cleaning step or the further air cleaning step. In an embodiment in which the checking step is performed during the cleaning step, a direct assessment of the cleaning can be advantageously performed. In particular, it is possible to adjust the amount of compressed air depending on the cleaning result during the application. Thus, for example, in the event of slight soiling, the exposure to compressed air can be adjusted early if the cleaning result is already positive.

Advantageously, it is provided that the waiting time is 500 ms. A waiting time of 500 ms is a suitable compromise, since after this time a significant part of the soiling has been detached and removed from the sensor surface after the application, but at the same time the fastest possible assessment of the cleaning result is achieved.

The disclosure is developed in that the method is performed in the event of a negative initial cleaning result of an initial checking step. In such an embodiment of the method, an initial checking step can be performed at predetermined time intervals and/or after a predetermined mileage of the vehicle in a starting step of the method to assess the need for cleaning the sensor surface.

In particular, it is provided that the method is performed in the event of a positive rain signal from a rain sensor. Such an embodiment can be performed in a starting step, in particular in addition to a cyclic performance of the initial checking step and advantageously uses the circumstance that in the presence of rain, the sensor surface is more likely to be moist and thus soiling may have already softened and/or dissolved without the use of cleaning fluid. In this way, the sensor surface can be cleaned in a cleaning fluid-saving way. In particular, a rain sensor already present in the vehicle as part of a windscreen wiper system can be used as a rain sensor.

In particular, it is provided that the method is performed depending on an environment variable. In particular, an environment variable can describe the probability of bad weather, that is, in particular, the presence of rain, hail, or snow. For this purpose, the control unit of the cleaning system may be connected to control modules or sensors of the vehicle, which serve another primary purpose, for example, a thermometer, in particular an external thermometer, a windscreen wiper control unit, a windscreen heating control unit, a rear window heating control unit, an anti-lock braking system control unit (ABS), and/or an electronic stability control unit (ESP). Depending on the environment variable, the frequency of performance of the method can be adjusted so that cleaning is performed more frequently in bad weather to ensure the functioning of the sensor and/or to take advantage of the presence of moisture to perform cleaning—saving cleaning fluid—only with compressed air.

Advantageously, it is provided that a residual amount of fluid and/or a remaining operating time of the cleaning system is determined, wherein the determination is performed in particular on the basis of a residual number of cycles or a total number of cycles. The amount of residual fluid in the fluid tank can be determined directly by the measurements of a level sensor. Alternatively, an approximate determination of the residual amount of fluid can be performed on the basis of the actually consumed amount of cleaning fluid and a tank volume of the fluid tank.

Determination of the remaining number of cycles can be performed in particular on the basis of the residual amount of fluid and a defined constant or estimated expected, in particular averaged, amount of cleaning fluid per fluid cleaning step. A determination of the remaining operating time can be performed on the basis of the residual amount of fluid and assuming an average time interval between two performances of the cleaning method, as well as an amount of cleaning fluid to be expected per performance, wherein the expected amount of cleaning fluid per performance results from the expected number of cycles per performance and a defined constant or estimated expected, in particular averaged, amount of cleaning fluid per fluid cleaning step.

In such an embodiment of the method, the residual amount of fluid can be advantageously included in the route planning of the vehicle. In particular, it can be avoided that there is suddenly no cleaning fluid and the function of the cleaning system fails. In this way, downtimes, and interruptions of a vehicle's journey due to a dirty sensor can be advantageously avoided. In the event that the residual amount of fluid and/or the remaining operating time is no longer sufficient to reach a place for filling the cleaning tank, a driver or operator may be requested in good time to take over the control of the vehicle, in particular in an autonomous vehicle or in a semi-autonomous vehicle during autonomous driving functions, if it is foreseeable that a cleaning system can no longer guarantee a cleaning function after the remaining operating time. Alternatively, a vehicle, in particular an autonomous vehicle, can be transferred to a safe holding state, that is, stopped, in the event that the cleaning system can no longer guarantee a cleaning function.

The disclosure is developed in that after checking the air cleaning result in the checking step, in the event of a negative air cleaning result additionally an additional air cleaning procedure is performed, which has the steps:

applying an additional amount of compressed air to the sensor surface in an additional air cleaning step and checking the air cleaning result in an additional checking step. In such an embodiment—based on the concept of the disclosure to save as much liquid as possible during cleaning—first attempts are made to achieve cleaning of the sensor surface with one or more further additional air cleaning steps before an amount of cleaning fluid is used in a hybrid cleaning step.

In particular, it is provided that the additional air cleaning process is repeated until the air cleaning result is positive or an additional termination condition is reached. In such an embodiment, the additional air cleaning process can be repeated until the air cleaning result is positive, and thus the cleaning of the sensor surface was successful, or—if the air cleaning result is negative over one or more runs—can be aborted after a defined number of tests by reaching an additional termination condition.

In particular, it is provided that the additional termination condition is reached when an additional number of cycles has reached an additional maximum value. By recording an additional number of cycles in an additional counting step, the number of performances of the additional air cleaning process can be recorded and, in particular, when an additional maximum value is reached, the additional air cleaning process can be terminated in order to move on to the hybrid cleaning step. The additional maximum value can be, for example, 1 or 3 or 5 or 10.

In particular, it is provided that the additional amount of compressed air depends on the additional number of cycles in such a way that a larger number of additional cycles leads to a greater amount of additional compressed air.

The disclosure is developed in that the cleaning signal and/or the cleaning result is formed depending on a setpoint-actual comparison, in particular depending on a brightness deviation and/or a contrast deviation. In particular, the setpoint-actual comparison includes a comparison of the sensor signal SI or a feature of the sensor signal SI as an actual value with a comparison sensor signal or a reference sensor signal as the setpoint. In particular, a cleaning signal is output if a deviation between the target and actual values is exceeded. In particular, a negative cleaning result is output if a deviation between the target and actual values is exceeded.

The disclosure is developed in that the actual signal is formed by the sensor signal, and the setpoint signal is formed by a comparison sensor signal, which is provided in particular by at least one further sensor, and/or by a reference sensor signal, which is provided in particular by a reference memory. By comparing with a comparison sensor signal or a reference sensor signal, a sensor signal can be plausibility checked and/or validated better and thus advantageously a cleaning signal and/or a cleaning result can be generated more reliably.

In particular, to determine a cleaning signal and/or a cleaning result, an average brightness value of the image of the camera signal can be determined and compared with one or more brightness deviations, in particular occurring at some isolated points.

In particular, for the determination of a cleaning signal and/or a cleaning result, an average brightness value can be compared with an average comparison brightness value, wherein the average comparison brightness value is provided by one or more other sensors, in particular one or more other cameras.

In particular, for the determination of a cleaning signal and/or a cleaning result and/or a rain signal, a contrast or a contrast mean value in the form of a gray value gradient or a color value gradient can be formed, wherein to determine a contrast deviation the gray value gradient can be compared with a reference gray value gradient, or the color value gradient can be compared with a reference color value gradient.

In the context of an embodiment of the cleaning system, a sensor evaluation device is provided, wherein the sensor evaluation device has in particular a setpoint-actual comparison module and/or a brightness comparison module and/or a camera image comparison module and/or a contrast comparison module.

In the context of an embodiment of the cleaning system, a communication interface is provided, which is configured for communication with a vehicle bus and/or a wireless communication device. Such a communication interface advantageously enables bidirectional communication for the external control of the cleaning method, in particular for the external generation of a cleaning signal. In embodiments, the communication interface may also be configured for communication with a wired communication device.

In the context of an embodiment of the cleaning system, this includes a trigger switch. In the context of a preferred embodiment, the cleaning system is configured to communicate with a trigger switch and/or a communication device, in particular by wire or wirelessly, in particular for transmitting a cleaning signal to the cleaning system.

In the context of an embodiment of the cleaning system, a common nozzle is provided for applying an amount of compressed air and an amount of cleaning fluid to the sensor surface. By means of a common nozzle, a compact configuration of the cleaning device, in particular an application module, is advantageously achieved at the sensor surface. Also, the risk of freezing of the nozzle is advantageously reduced, because the nozzle can be blown free after each use by means of compressed air, whereby any remaining cleaning fluid can be removed.

In the context of an embodiment of the cleaning system, a common medium line is provided. With a common medium line, a space-saving configuration is advantageously achieved. Also, the risk of freezing of the cleaning fluid in the medium line is advantageously prevented, since the medium line can always be blown free after each use and thus the cleaning fluid can be removed from the medium line.

In the context of an embodiment of the cleaning system, the cleaning system has a piston unit with a fluid chamber and an air chamber, wherein the fluid chamber and the air chamber are separated from each other in a sealed manner by an axially movable pressure ram. In particular, the piston unit has a return spring that connects the pressure ram to the housing of the piston unit in order to generate a restoring force acting in the axial direction on the pressure ram, in particular to move the pressure ram into a rest position after exposure to compressed air.

In an embodiment of the vehicle, the vehicle is an autonomous vehicle. In an embodiment of the vehicle, the vehicle has a vehicle bus, in particular a CAN bus, and the cleaning system has a communication device that is and/or can be connected to the vehicle bus in a signal transferring manner.

BRIEF DESCRIPTION OF THE DRAWINGS

The invention will now be described with reference to the drawings wherein.

DESCRIPTION OF THE PREFERRED EMBODIMENTS

Figure 1B:
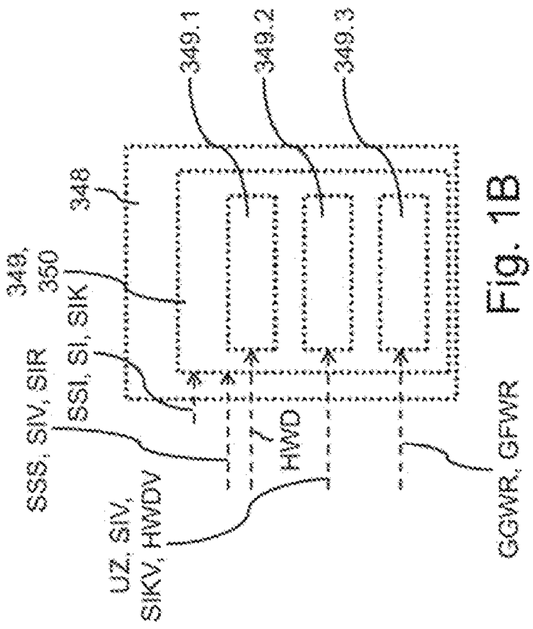
FIGS. 1B, 1C show a sensor evaluation device and a representation for the demonstration of the functionality.
Figure 1C:
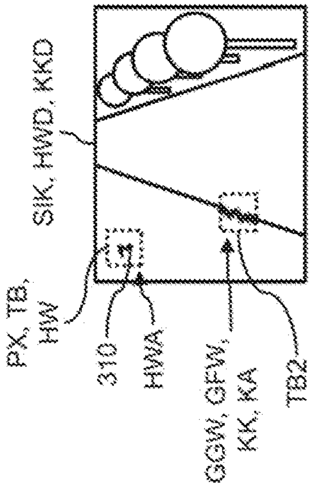
Figure 1A:
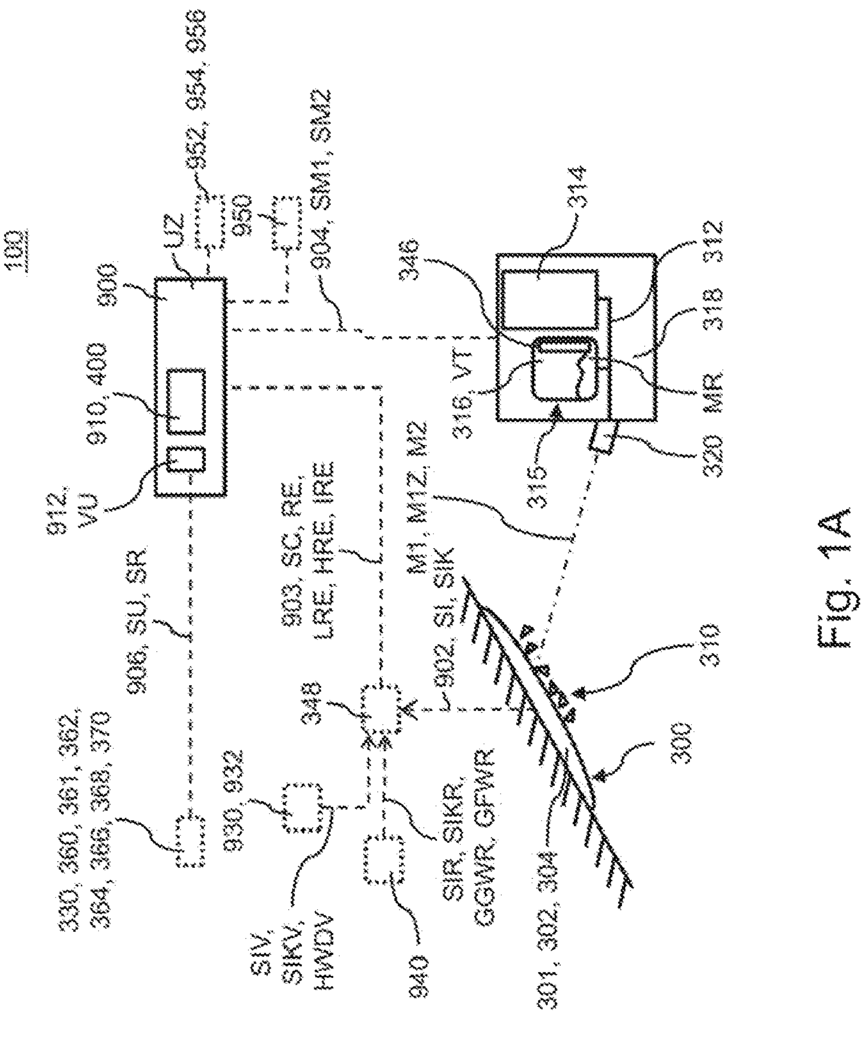
FIG. 1A shows a cleaning system configured to perform the method according to the first aspect of the disclosure.

FIG. 1A shows a cleaning system 100 for cleaning a sensor surface 300 of a sensor 301 in the form of an optical sensor 302 of a vehicle 1000 which is not represented here in detail. The optical sensor 302 is in the present case in the form of a camera 304 for recording the environment. The cleaning system 100 also has a control unit 900, which has a program memory 910, in which a method 400 can be stored for performance.

By means of a sensor line 902, the sensor 301 is connected to the control unit 900 in a signal transferring manner for the transmission of a sensor signal SI. Optionally, the sensor 301, in particular interposed in the sensor line 902, may have a sensor evaluation device 348 or a similar signal processing unit in which the sensor signal SI is processed. In this case, the sensor 301 is connected via the sensor line 902 to the sensor evaluation device 348, and the sensor evaluation device 348 is connected via an evaluation line 903 to the control unit 900. In a sensor evaluation device 348 or similar evaluation device of the sensor 301 and/or the vehicle 1000, in particular, the sensor signal SI can be evaluated as to whether cleaning is required. Depending on this check, in particular depending on soiling of the sensor and a resulting deterioration of the signal quality of the sensor signal SI, in particular a cleaning signal SC can be output. In an analogous manner, a cleaning result RE, in particular an initial cleaning result, air cleaning result LRE or a hybrid cleaning result, can be provided by the sensor evaluation device 348. The cleaning signal SC may in particular be binary and/or Boolean in nature and may take the value "1" or "TRUE" if cleaning is required and correspondingly the value "0" or "FALSE" if no cleaning is required. Alternatively or additionally, the cleaning signal SC can be in the form of a voltage, wherein a voltage of, for example, 5 volts is applied if cleaning is required and no voltage, that is, a voltage of 0 volts, if no cleaning is required. The signal for cleaning can also be transmitted via the vehicle CAN bus or a subordinate vehicle bus.

An air cleaning result LRE, a hybrid cleaning result HRE and/or an initial cleaning result IRE can be transmitted to the control unit 900 via the sensor line 902.

The cleaning signal SC can be generated by a number of methods or a combination of the different methods by the sensor evaluation device 348, in particular by different modules 349, 349.1, 349.2, 349.3 of the sensor evaluation device 348, It is clear to the person skilled in the art at this point that there may be preferred methods far determining the signal quality and for determining a cleaning signal SC for each type of sensor. In general, other sensor systems such as radar, lidar, infrared or ultrasonic sensors that can be used as the sensor 301 are less susceptible to light soiling than cameras. Nevertheless, they may have to be freed from soiling of their surfaces. For the generation of the cleaning signal SC, a setpoint-actual comparison 350, in particular in a setpoint-actual comparison module 349, can preferably be performed in the sensor evaluation device 348. In a setpoint-actual comparison module 349, a sensor signal SI, in particular a camera signal SIK, can be compared as an actual signal SSI with a reference sensor signal SIR as a setpoint signal SSS. A reference sensor signal SIR can be stored in a reference memory 940 and provided. Alternatively or additionally, a comparison of a sensor signal SI, in particular a camera signal SIK, with a comparison sensor signal SIV as a setpoint signal SSS, in particular with a comparison camera signal SIKV, can be performed by the setpoint-actual comparison module 349, in particular to conclude, for example, soiling 310 of the sensor surface 300 and thereby in particular to exclude other influences such as darkness by comparison with a current comparison signal. The comparison sensor signal SIV can be provided by another sensor 930, in particular of the same vehicle 1000. If it is determined in the setpoint-actual comparison module 349 that the sensor signal SI or a feature of the sensor signal SI exceeds a limit value, in particular exceeds a reference sensor signal SIR and/or a comparison sensor signal SIV—or exceeds it by a certain tolerable amount—a cleaning signal SC is output by the sensor evaluation device 348. Such a comparison may be related to the entire soiled sensor surface 300 and/or to a subregion TB of the soiled sensor surface 300. However, a comparison with a limit value can also relate to noise or scattering of the sensor signal SI, in particular the camera signal SIK, which occurs due to soiling 310 of the sensor surface 300.

The deterioration of the signal quality can be detected in the sensor evaluation device 348 by various methods, which can be implemented in modules 349.1, 349.2, 349.3 of the sensor evaluation device 348, see FIG. 1B. The modules 349.1, 349.2, 349.3 represent in particular embodiments of the setpoint-actual comparison module 349. The sensor evaluation device 348 may have a brightness comparison module 349.1. If, for example, a cleaning signal SC and/or a cleaning result RE is to be determined depending on a sensor signal SI in the form of a camera signal SIK, an average brightness value HWD of the image of the camera signal SIK can be determined in a brightness comparison module 349.1 and can be compared with in particular brightness deviations HWA occurring at some isolated points, see FIG. 1C. The average brightness value HWD is formed in particular by forming an average value of individual brightness values HW of a number, in particular the totality, of subregions TB or pixels PX of the image of the camera signal SIK. Soiling 310 on the sensor surface 300, in particular a spot on the camera lens of a camera 304 caused by dirt, generates in particular selectively in a subregion TB or a pixel PX a lower brightness value HW than is the case in the rest of the image of the camera signal SIK, in particular less than the average brightness value HWD, so that soiling 310 can be concluded and a cleaning signal SC can be output accordingly.

The sensor evaluation device 348 may have a camera image comparison module 349.2. In particular, if the entire sensor surface 300 of the camera 304 or a predominant part of it is covered by soiling 310, the entire image has an unexpected brightness value, in particular an unexpectedly low average brightness value HWD. In order to validate the brightness, in particular an unexpectedly low average brightness value HWD, images from one or more other sensors 930, in particular other cameras 932, and/or the time UZ can be taken into account by the camera image comparison module 349.2. The time UZ can be provided in particular by the control unit 900. The at least one additional camera 932 can provide a comparison camera image SIKV with an average comparison brightness value HWDV. Alternatively or additionally, the average comparison brightness value HWDV can be provided by another suitable additional sensor 930. By comparing it with the comparison brightness value HWDV, it becomes possible to determine whether there is soiling 310 or whether it is only dark in the environment. The same applies to the influencing factor of the time UZ, which can be used to take into account the time of day-dependent lighting conditions and in particular to represent the difference between day and night.

The sensor evaluation device 348 may also have a contrast comparison module 349.3. By comparing a contrast KK, in particular of a subregion TB of the camera signal SIK and/or a contrast average value KKD—formed over the entire image of the camera signal SIK—an image evaluation can be performed in the contrast comparison module 349.3. A contrast KK and/or a contrast average value KKD can be determined in particular by a gray value gradient GGW or a color value gradient GFW. A blurred image, and thus in particular rain occurring, can be determined by recognizing that an unclear edge pattern is present—as shown in FIG. 1C as an example for another subregion TB2. In particular, this means that the gray value gradient GGW or the color value gradient GFW is no longer plausible and/or can no longer be determined as plausible. The gray value gradient GGW and/or the color value gradient GFW can be determined for a subregion TB2 or for the entire image of the camera signal. SIK. The gray value gradient GGW can be compared with a reference gray value gradient GGWR to determine whether there is a contrast deviation KA. The color value gradient GFW can be compared with a reference color value gradient GFWR to determine whether there is a contrast deviation KA. On the basis of a contrast deviation KA, a rain signal SR and/or a cleaning signal SC can be provided by the contrast comparison module 349.3. In particular, the contrast comparison module 349.3 can provide the rain signal SR alternatively or in addition to a rain sensor 330. Furthermore, the contrast comparison module 349.3 can determine a soiled sensor surface 300, in particular a moist soiled surface 300, by means of a deviating gray value gradient GGW or color value gradient GFW based on the contrast deviation KA.

Alternatively or additionally, the cleaning signal SC can also be generated manually.

If the driver detects, for example on a display, that the camera signal SIK and/or the sensor signal SI is distorted, he can also generate the cleaning signal SC manually, in particular by operating a trigger switch 950 and/or other control for generating the cleaning signal SC to achieve a performance of the method 400. The trigger switch 950 may be configured as a physical switch or button or as a programmatic implementation of a control panel in a graphical user interface, for example in a touch-sensitive display. This makes it possible to react to situations in which the sensor evaluation device 348 cannot provide valid values and/or has failed or a cleaning result RE is not sufficient for the driver. At this point, it should be mentioned that it is independent of where the display is located, whether in the vehicle or outside.

The cleaning system 100 may have a communication interface 952, which is configured for communication with a vehicle bus 954 and/or a wireless communication device 956. For example, by means of such a communication interface 952, a cleaning system can be retrofitted as a retrofit solution in a vehicle with such a vehicle bus 954, in particular a CAN bus. The communication interface 952 may be configured for wired and/or wireless communication.

In particular, the communication interface 952 may be configured for wireless communication with a wireless communication device 956. A wireless communication device 956 may be in particular a computer, handheld, smartphone, or similar mobile device. The connection between the communication interface 952 and the wireless communication device 956 can be made by means of a suitable radio protocol, for example WLAN, Bluetooth, GSM, UMTS or the like. The communication between the communication interface 952 and the wireless communication device 956 can take place directly, or indirectly via servers, radio masts and/or similar infrastructure components.

Alternatively or additionally, the cleaning signal SC can also be generated by an operator who is not in the vehicle and who follows the camera image and/or other sensor result via an external display. This is especially the case with remote-controlled vehicles. Here, the driver/operator generates the cleaning signal SC via a wireless communication device 956, which can be, for example, a mobile device or a computer. This is particularly advantageous if a driver/operator has to monitor several vehicles that operate autonomously. In particular, the cleaning signal SC can also be sent to the vehicle via a wireless transmission device. The vehicle picks up the cleaning signal SC, which was sent by a wireless communication device 956, by means of the communication interface 952 and transmits it to the cleaning system 100. The transmission can alternatively or additionally take place via a vehicle bus 954 and/or another data connection within the vehicle 1000. The cleaning signal SC can also be transmitted directly to the cleaning system 100 wirelessly.

Analogous to the possibilities described here for generating the cleaning signal, a cleaning result can also be determined.

The cleaning system 100 also has a cleaning device 318, which is connected to the control unit 900 via a control line 904 in a signal transferring manner. The cleaning device 318 has a nozzle 320, which is configured and arranged to direct both an amount of compressed air M1, as well as an amount of cleaning fluid M2 to the sensor surface 300. The cleaning system 100 has a compressed air source 314 or is pneumatically connected to such a compressed air source 314 for providing an amount of compressed air M1. In particular, the compressed air source 314 may be configured as a compressed air accumulator or as a compressor. Furthermore, the cleaning device 318 has a cleaning fluid source 315 for providing the amount of cleaning fluid M2. The cleaning fluid source 315 may have a fluid tank 316, wherein the amount of cleaning fluid M2 can be passed through the nozzle 320 under pressure by the compressed air source 314, in particular by means of a piston unit. In an embodiment, the cleaning fluid source 315 may also have a pump for conveying the amount of cleaning fluid M2 through the nozzle 320. The cleaning fluid source 316 or the fluid tank 316 may have a level sensor 346 for determining a residual amount of fluid MR and/or a residual number of cycles ZR.

By means of the control line 904, the control unit 900 can transmit a compressed air control signal SM1 to the cleaning device 318 to apply an amount of compressed air M1 to the sensor surface 300. By means of the control line 904, the control unit 900 can transmit a cleaning fluid control signal SM2 to the cleaning device 318 in order to apply an amount of cleaning fluid M2 to the sensor surface 300. By means of the method, the sensor surface 300 can be cleaned, that is, freed from dirt 310.

The cleaning device 318 may have electromagnetic actuators, in particular electromagnetic valves, for selective control of the amount of compressed air M1 and/or of the cleaning fluid M2.

In optional embodiments, the control unit 900 may have an environment determination unit 912, which can be connected in a signal transferring manner via a system line 906 to at least one of the following systems for determining an environment variable VU on the basis of at least one environment signal SU: a rain sensor 330, a thermometer 360, especially an external thermometer 361, a windscreen wiper control unit 362, a windscreen heating control unit 364, a rear window heating control unit 366, an anti-lock braking system (ABS) control unit 368, and/or a control unit 370 for electronic stability control (ESP).

Figure 2B:
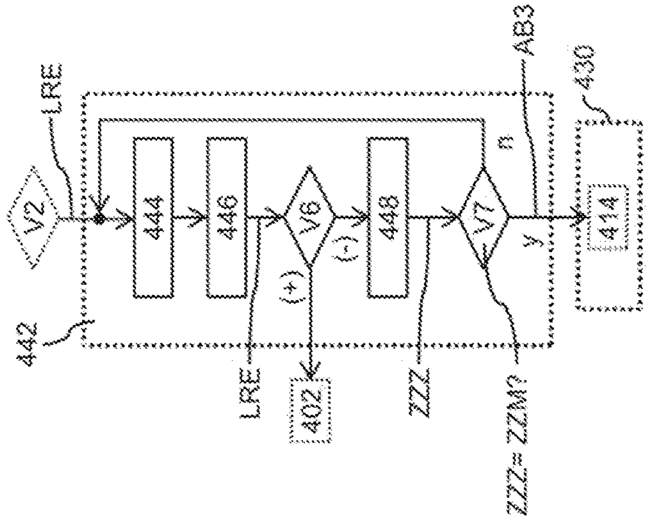
FIG. 2B shows a section of an embodiment of the method with an additional air cleaning process.
Figure 2A:
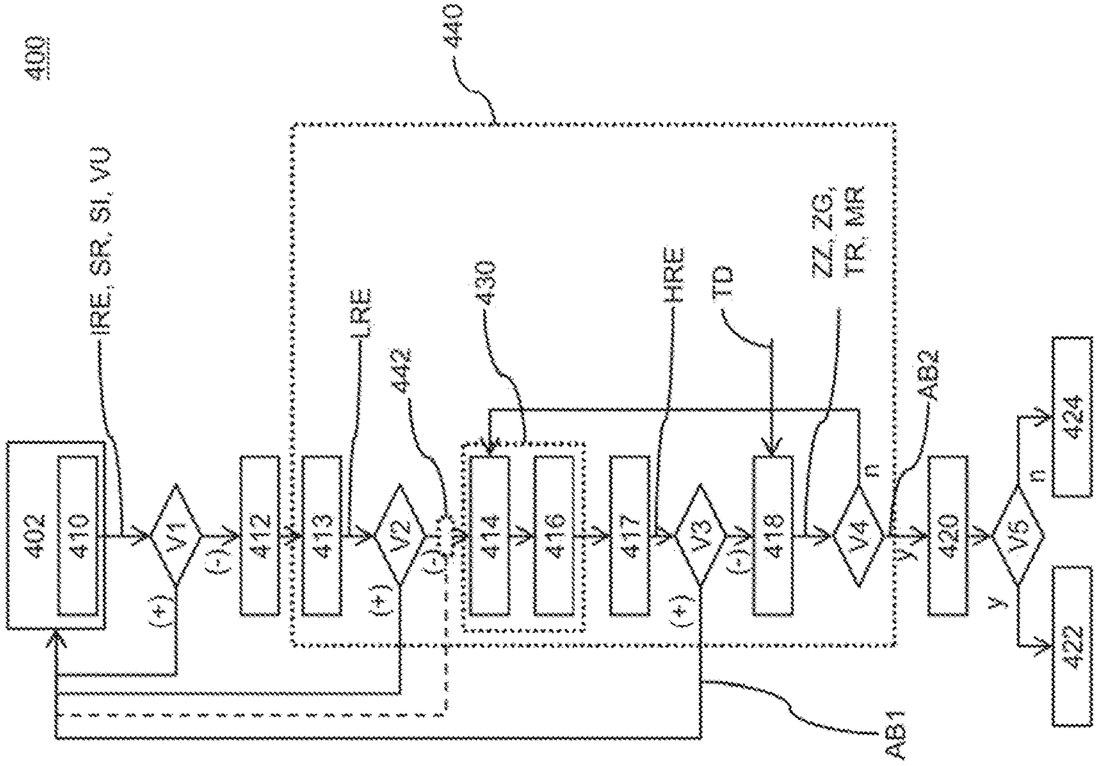
FIG. 2A shows an embodiment of a method according to the first aspect of the disclosure.

FIG. 2A shows an embodiment of method 400 according to the concept of the disclosure.

For a starting step 402, it is first checked whether the implementation of the method 400 should be started. For this purpose, the starting step 402 may in particular have an initial checking step 410, in which an initial cleaning result IRE is queried by the sensor 301, which is not shown here.

Alternatively or additionally, the method 400 can be performed depending on a rain signal SR and/or other environment signals SI, that is, in the event of a positive rain signal SR, the presence of rain moisture can be advantageously used for cleaning the sensor surface 300, in particular without consuming cleaning fluid. Alternatively or additionally, an environment variable VU can be determined on the basis of one or more environment signals SI, depending on which the method 400 is performed or not.

In a first branch V1, it is checked whether the initial cleaning result IRE is negative. A cleaning result RE, and in particular an initial cleaning result IRE, is negative if a certain degree of soiling has been exceeded, which can be determined, for example, by the decreasing degree of light transmission with increasing soiling. In particular, this can be detected by falling below a certain brightness value of the sensor 301. With a camera as an optical sensor, the cleaning result RE can be determined by means of a comparison with a reference image, wherein the differences from the reference image increase with the increasing degree of soiling.

In the case of a negative initial cleaning result IRE, an air cleaning step 412 is performed, in which an amount of compressed air M1 is applied to the sensor surface 300. At the same time or subsequently, a check of the air cleaning step 412 is performed in a checking step 413, in which an air cleaning result LRE is queried by the sensor 301. In embodiments of the method, the checking of a cleaning step, in particular the air cleaning step 412, can be performed by receiving a cleaning signal SC, which indicates the necessity of cleaning, and thus in particular the success of a previous cleaning step. The determination of the air cleaning result LRE is performed analogously to the cleaning result RE described above. In a second branch V2, it is checked whether the air cleaning result LRE is negative.

In the event that the air cleaning result. LRE is positive, the air cleaning step 412 was successful, and the method is returned to the starting step 402. After the return to the starting step 402, optionally a new performance of the method 400 takes place after a defined time interval and/or depending on the rain signal SR and/or other starting conditions.

In the event that the air cleaning result LRE is negative, a hybrid cleaning step 430 is performed, which in turn includes a fluid, in particular liquid, cleaning step 414 and another air cleaning step 416.

In the fluid, in particular liquid, cleaning step 414 an amount of cleaning fluid M2 is first applied to the sensor surface 300, wherein immediately thereafter or after an adjustable waiting time an amount of compressed air M1 is applied in a further air cleaning step 416. The amount of compressed air M1 can correspond to the amount of compressed air M1 from the air cleaning step 412, or may differ from it, that is, may be more or less.

Following the hybrid cleaning step 430, a further checking step 417 is performed to check the effectiveness of the hybrid cleaning step 430. In the further checking step 417, analogous to the cleaning result RE described above, a hybrid cleaning result HRE is queried by the sensor 301.

In a third branch V3, it is checked whether the hybrid cleaning result HRE is positive or negative. In the event that the hybrid cleaning result HRE is positive, a first termination condition AB1 is met and the method is returned to the starting step 402, as also in the case of the second branch V2.

In the event that the hybrid cleaning result HRE is negative, a number of cycles ZZ is increased in a counting step 418, that is, increased by 1. A cycle describes in particular a performance of the steps fluid, in particular liquid, cleaning step 414, further air cleaning step 416 and further checking step 417.

Overall, that is, over multiple performances of the method, a total number of cycles ZG can be determined, which records the total number of fluid, in particular liquid, cleaning cycles, in particular since the last filling of the fluid tank.

In particular, the total number of cycles ZG is also increased for a fluid cleaning cycle with a positive cleaning result, so that all fluid cleaning cycles are recorded, advantageously for the exact calculation of a residual amount of fluid. In other embodiments, a total number of cycles ZG can also be formed in another way, for example in such a way that a total number of cycles ZG is increased with each performance of the method, for example after the air cleaning step 412.

Optionally, a residual amount of fluid MR which is still available in the fluid tank 316 can also be determined on the basis of the number of cycles ZZ and the amount of cleaning fluid M2 used in each case. In embodiments in which a level sensor 346 is available in the fluid tank 316, alternatively or additionally the residual amount of fluid MR can be determined by sensor.

Based on the residual amount of fluid MR, a remaining operating time TR can be predicted, A remaining operating time TR indicates, assuming an average time interval TD between two performances of the cleaning method, for how long it is still possible to operate the cleaning system 100 with the existing residual amount of fluid MR. The average time interval TD can be determined in particular on the basis of a current environment variable VU, or of an average value of a set of environment variables that have occurred previously, for example environment variables determined during the last 100 km, in order to obtain a time-averaged average value as the average time interval TD. On the basis of the remaining operating time TR, a suitable vehicle stop for refilling the fluid tank 316 can therefore be taken into account in route planning in particular in the case of an autonomous vehicle 1001, and/or—in particular in the case of a conventional, non-autonomous or semi autonomous vehicle—a corresponding indication can be generated for the driver due to the cleaning no longer being guaranteed, which in particular calls for taking over control of the vehicle.

In a subsequent fourth branch V4, it is checked whether the number of cycles ZZ has exceeded a maximum value ZM. If this is not the case, a return to the hybrid cleaning step 430 is performed, which means that the fluid, in particular liquid, cleaning step 414 and the further air cleaning step 416 are performed again. In particular, the amount of cleaning fluid M2 is increased depending on the number of cycles ZZ.

This means that the more often the hybrid cleaning step 430 has been performed, the greater is the amount of cleaning fluid M2. This connection is based on the idea that in the event of a negative hybrid cleaning result HRE in the following hybrid cleaning step 430, the amount of cleaning fluid M2 can be successively increased to a maximum amount of cleaning fluid M2M to strengthen the cleaning effect until a positive hybrid cleaning result HRE is achieved and in the third branch V3 a return to the starting step 402 takes place.

In the event that no positive hybrid cleaning result HRE is achieved despite repeated performance of the hybrid cleaning step 430, a second termination condition AB2 is achieved when the maximum value ZM of the number of cycles ZZ is reached in the fourth branch V4, whereupon an error message is output in an error step 420. In particular, the error message can be transmitted from the control unit 900 to a vehicle control unit 1010 of the vehicle 1000 (not shown here) and transmitted from there to a driver or an operator responsible for an autonomous vehicle 1001. Following the error step 420, in a fifth branch V5 a check is performed as to whether the sensor 301 is a safety-relevant sensor. If this is the case, an emergency operation step 422 initiates emergency operation of the vehicle 1000 or a signal for the initiation of such emergency operation is transmitted, in particular to the vehicle control unit 1010, in order to minimize the risk of a hazard to the vehicle 1000 and/or the environment of the vehicle 1000 due to the impaired functioning of the sensor 301. During an emergency operating mode, in particular, the speed may be reduced or manual intervention by an operator or other safety measures may be required. In the event that the sensor 301 is not a safety-relevant sensor, the method 400 is terminated in a termination step 424. In this case, in particular, a message is generated to request further cleaning, in particular manual cleaning, of the sensor surface 300.

FIG. 26 shows—with reference to FIG. 2A—a section of an optional embodiment of the method with an additional air cleaning process 442, which can be performed in the sequence of steps 440 after checking the air cleaning result LRE in the checking step 413, namely with a negative air cleaning result LRE. After the negative air cleaning result LRE has been determined in the second branch V2, an additional amount of compressed air M1Z is again applied to the sensor surface (300) in an additional air cleaning step 444. The additional amount of compressed air M1Z can correspond to the amount of compressed air M1. The additional amount of compressed air M1Z can also be formed as a function of an additional number of cycles ZZZ, analogous to a formation of the amount of compressed air M1 as a function of the number of cycles ZZ.

Following the additional air cleaning step 444, the air cleaning result LRE is checked again in an additional checking step 446. In a sixth branch V6, it is checked whether the air cleaning result LRE is positive or negative. In the case of a positive air cleaning result LRE, a return to the starting step 402 takes place, since in this case the cleaning of the sensor surface was only successful by means of air cleaning steps or additional air cleaning steps. In the event of a negative air cleaning result LRE, an increase of an additional number of cycles 77Z is performed in an additional counting step 448, by means of which the number of performances of the additional air cleaning process 442 within a performance of the sequence of steps 440 is recorded. In a seventh branch V7 it is checked whether the additional number of cycles ZZZ has reached an additional maximum value ZZM. If this is not yet the case, a return to the additional air cleaning step 444 is performed for a renewed performance of the additional air cleaning process 442. If the additional number of cycles ZZZ has reached the additional maximum value ZZM, an additional termination condition AB3 is achieved, and the hybrid cleaning step 430, and in particular the fluid, in particular liquid, cleaning step 414, is performed. Consequently the method 400 is continued, in particular as shown in FIG. 2A.

Figure 3:
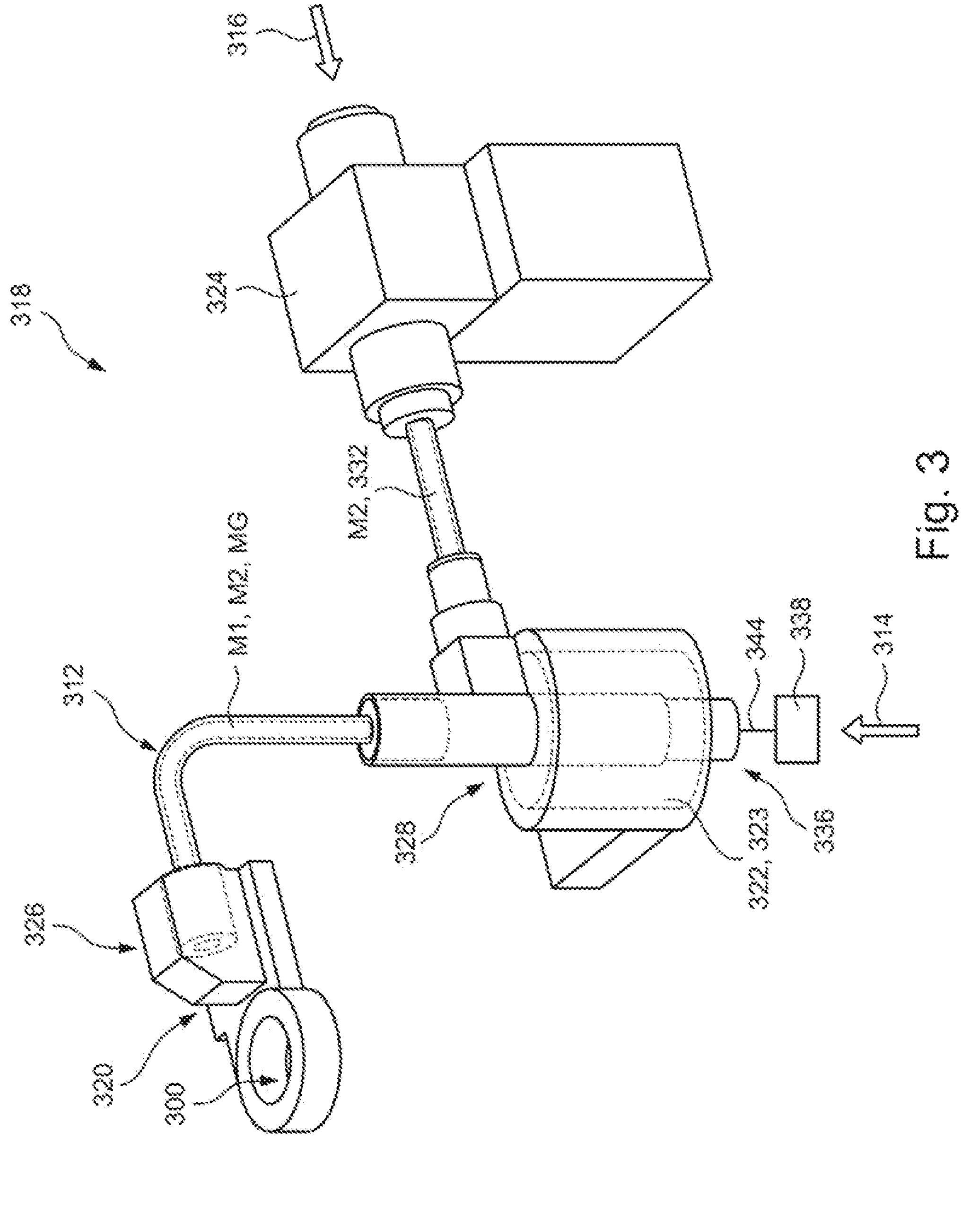
FIG. 3 shows a first embodiment of a cleaning device for a cleaning system according to the second aspect of the disclosure.

FIG. 3 shows a cleaning device 318 for a cleaning system 100 according to the concept of the disclosure. For cleaning a sensor surface 300 of a sensor 301 which is not shown here, a nozzle 320 is arranged in an application module 326. The nozzle 320 is connected in a fluid transferring manner via a common medium line 312 to a combination unit 328. The cleaning fluid M2 is fed via a fluid line 332 into the combination unit 328, which can be controlled by means of a fluid valve 324. The combination unit 328 has a piston unit 322. When an amount of cleaning fluid M2 is supplied to the combination unit 328, it accumulates in the piston unit 322. By supplying a pressure port 336 of the piston unit 322, the amount of cleaning fluid M2 located in the piston unit 322 can be directed under pressure via the common medium line 312 and the nozzle 320 to the sensor surface 300. For this purpose, the pressure port 336 is connected via a piston unit line 344 to a compressed air source 314 which is not shown here. By means of a compressed air valve 338 arranged in the piston unit line 344, which is in particular in the form of an electromagnetic valve, selective supply to the pressure port 336 can be performed. The compressed air valve 338 can be controlled in particular by means of a control unit 900 which is not shown here. The fluid valve 324 can be controlled in particular by means of a control unit 900 which is not shown here. By controlling the compressed air valve 338 and the fluid valve 334, a method according to the concept of the disclosure for cleaning the sensor surface 300 can be performed by means of a control unit 900 in an automated manner. The fluid line 332 is connected to a fluid tank 316 which is not shown here. If no cleaning fluid M2 has been fed into the piston unit 322 due to closing the fluid valve 324, an amount of compressed air M1 is passed to the sensor surface 300 via the nozzle 320 instead of the cleaning fluid M2, in particular to perform an air cleaning step.

In embodiments, the combination unit 328 and/or the piston unit 322 may be formed as a venturi unit 323, in which the amount of cleaning fluid M2 is mixed with the amount of compressed air M1 or another amount of compressed air to form a cleaning mixture MG and as such is conducted to the sensor surface 300 via the common medium line 312. For this purpose, the fluid valve 324 and the compressed air valve 338 are opened simultaneously. If the fluid valve 324 is closed and the compressed air valve 338 is opened, however, only compressed air, in particular an amount of compressed air M1, is passed to the sensor surface 300 through the venturi unit 323 and the common medium line 312.

Figure 4B:
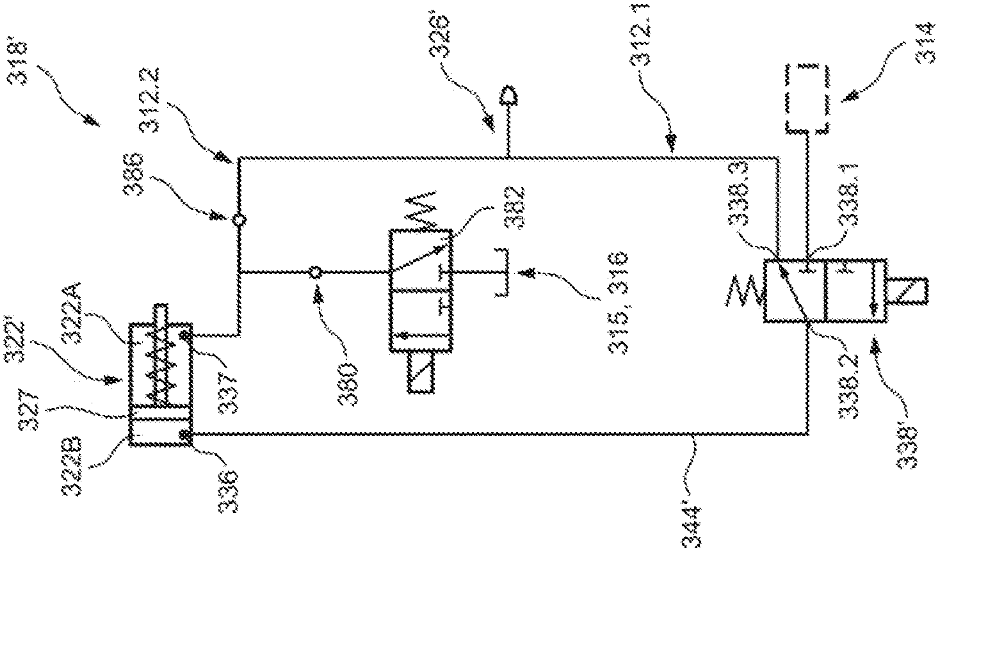
FIGS. 4A, 4B each show a second embodiment of a cleaning device for a cleaning system according to the second aspect of the disclosure.
Figure 4A:
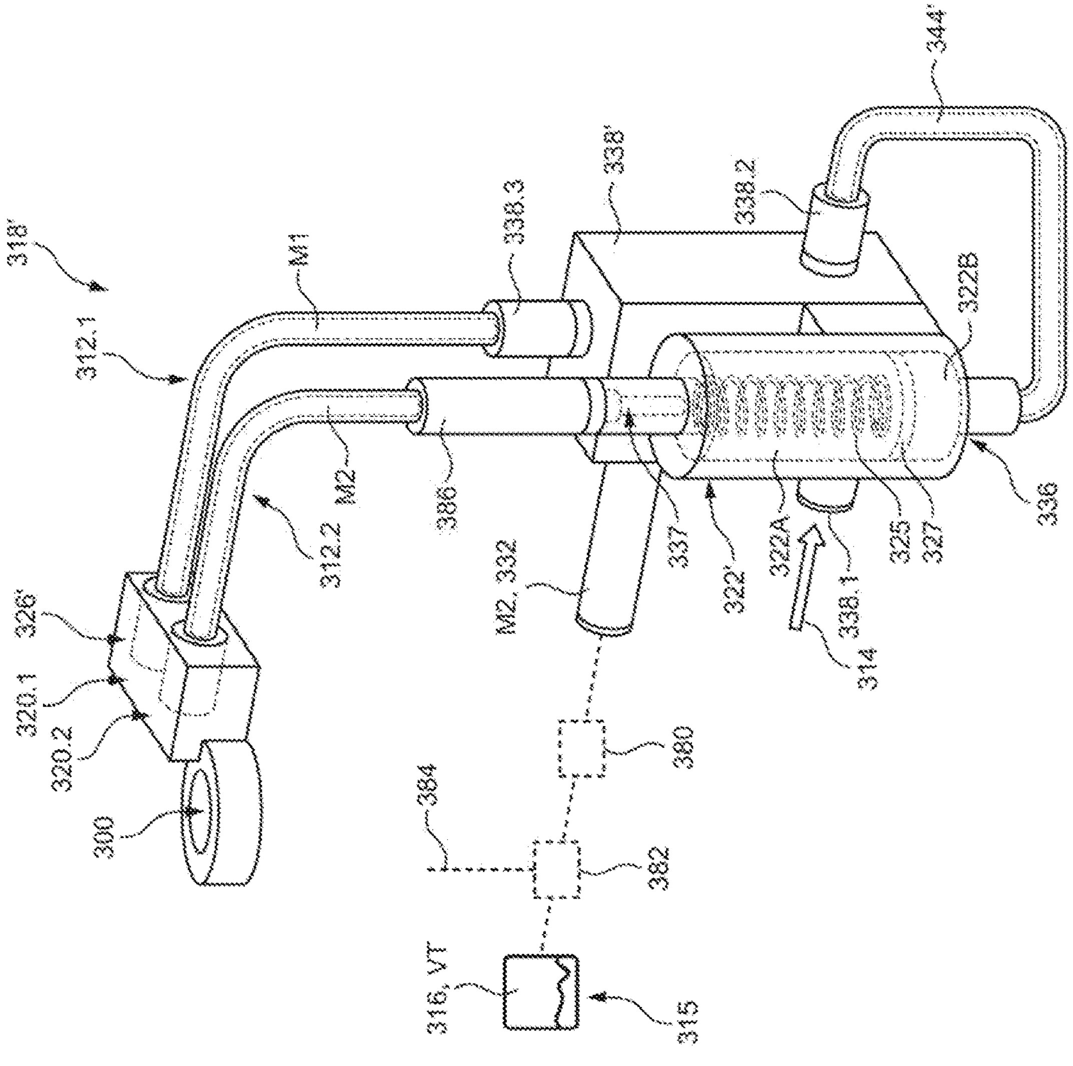

FIG. 4A shows a further embodiment of a cleaning device 318' for a cleaning system 100 according to the concept of the disclosure. In contrast to the embodiment shown in FIG. 3, instead of a common medium line 312 the cleaning device 318' has a first medium line 312.1 for an amount of compressed air M1 and a second medium line 312.2 for an amount of cleaning fluid M2. The application module 326' accordingly has a first nozzle 320.1, which is connected to the first medium line 312.1 in a fluid transferring manner and a second nozzle 320.2, which is connected to the second medium line 312.2 in a fluid transferring manner. The cleaning device 318' has, analogous to the embodiment shown in FIG. 3, a piston unit 322'. The piston unit 322' has a fluid chamber 322A and an air chamber 3228, which are separated from each other by an axially movable pressure ram 327. The pressure ram 327 is further connected to the housing of the piston unit 322' via a return spring 325 arranged in the fluid chamber 322A. The second medium line 312.2 is connected via a fluid port 337 to the fluid chamber 322A of the piston unit 322'. The air chamber 3228 can be pressurized with air pressure via a pressure port 336, whereby the volume of the air chamber 322B changes under axial movement of the pressure ram 327, to pass an amount of cleaning fluid M2 located in the fluid chamber 322A under pressure and against the return spring 325 via the second nozzle 320.2 to the sensor surface 300. The cleaning device 318' has a compressed air valve 338', The second medium line 312.2 may have a fluid check valve 386, which opens in the flow direction from the piston unit 322' to the application module 326' and blocks in the opposite direction.

When a compressed air application via the pressure port 336 is interrupted, the pressure ram 327 is pushed back to an initial position by means of the return spring 325, whereby the piston unit 322' sucks in new cleaning fluid M2. The piston unit 322' can be filled via a fluid line 332. The compressed air valve 338' can be controlled by a control unit 900 which is not shown here and is used on the one hand to provide the amount of compressed air M1 to the first nozzle 320.1 via the first medium line 312.1, and on the other hand to pressurize the pressure port 336 of the piston unit 322' via a piston unit line 344 to direct the amount of cleaning fluid M2 via the second nozzle 320.2 to the sensor surface 300. The compressed air valve 338' may be in the form in particular of a 3/2-way solenoid valve that optionally in a first position can pass the amount of compressed air M1 applied at a first compressed air valve port 338.1 via a second compressed air valve port 338.2 to the pressure port 336 of the piston unit 322', or in a second position can pneumatically connect the second compressed air valve port 338.2 to a third compressed air valve port 338.3 in order to direct the amount of compressed air M1 forced out of the piston unit 322' by the return spring 325 via the first medium line 312.1 and the first nozzle 320.1 to the sensor surface. An embodiment of the method can advantageously be realized by the functionality of the piston unit 322', wherein an identical amount of compressed air M1 and amount of cleaning fluid M2 per cleaning cycle is output, since the volume of cleaning fluid M2 displaced by the pressure ram 327 corresponds to the volume of compressed air M1 displaced by the return spring 325 during the return process. In particular, in an embodiment with a piston unit 322', the amount of compressed air M1 and the amount of cleaning fluid M2 can be determined together from the amount of compressed air M1, in particular over a switching time of the compressed air valve 338', in particular in such a way that both amounts M1, M2 do not correspond to the full volume of the piston unit 322' in that the compressed air valve 338' is switched before the cleaning fluid has been completely pushed out of the piston unit 322'.

In particular, no fluid valve is necessary in the embodiment shown here, since a selective pressurization of the pressure port 336 via the compressed air valve 338' is possible, and the medium lines 312.1, 312.2 are routed separately. To supply the cleaning device 318', the compressed air valve 338' is connected to a compressed air source 314 which is not shown here. The fluid line 332 may have in particular a check valve 380, which opens in the flow direction of the cleaning fluid M2 from a fluid tank 316 to the cleaning device 318' and blocks in the opposite direction. Furthermore, the fluid line 332, in particular between the check valve 380 and the fluid tank 316, may have a 3/2-way valve, by means of which in a further valve position air can optionally be routed via a ventilation line 384 through the fluid line 332 to the piston unit 322', especially if an air cleaning step is to be performed, that is, without applying the cleaning fluid M2. The piston unit 322' then conveys air in both directions.

In FIG. 4B, the further embodiment shown in FIG. 4A is schematically represented as a pneumatic circuit diagram, thus the above explanations apply accordingly.

Figure 5:
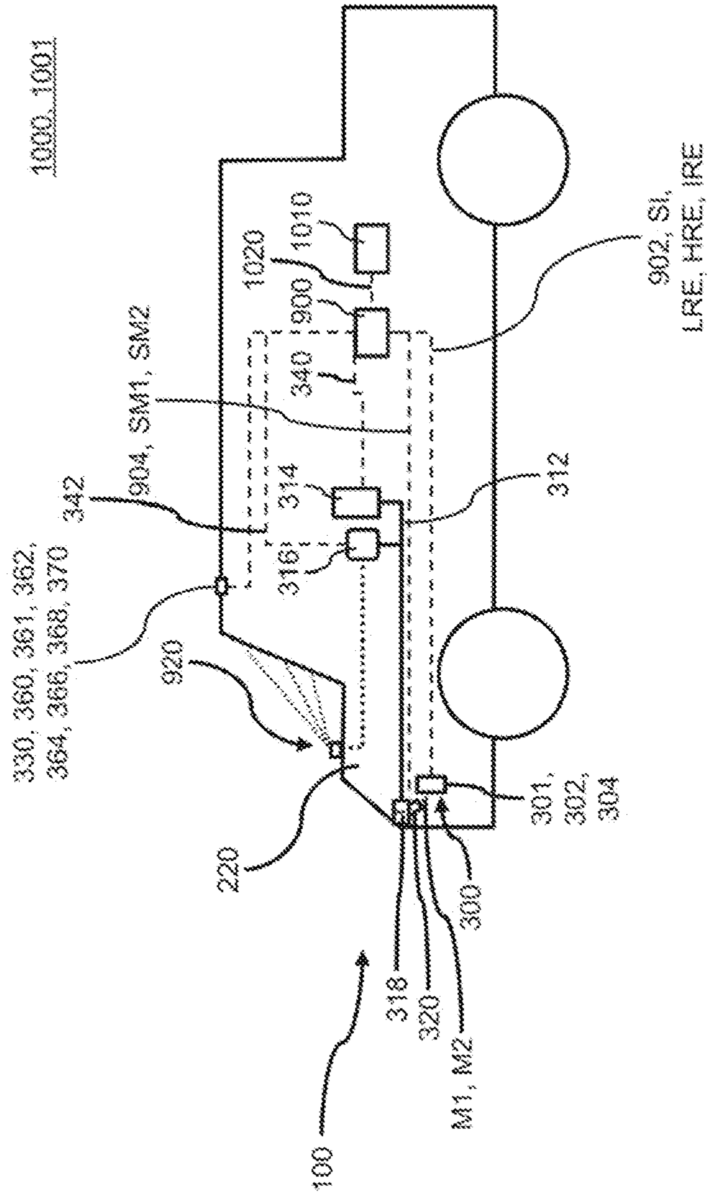
FIG. 5 shows a vehicle with a cleaning system according to the second aspect of the disclosure; and, FIG. 6 shows a schematic profile of residual amounts of fluid and number of cycles.

FIG. 5 shows a schematic representation of a vehicle 1000—in the present case in the form of an autonomous or semi-autonomous vehicle 1001—having a cleaning system 100 for a sensor 301 in the form of an optical sensor 302, namely of a camera 304. Nevertheless, the cleaning system 100 can be used in other vehicles, in particular conventional cars or trucks or trains or motorcycles.

The cleaning system 100 has a control unit 900, which is connected to a vehicle controller 1010 via a vehicle control line 1020 in a signal transferring manner. The control unit 900 is connected via a control line 904 to a cleaning device 318 in a signal transferring manner, in particular for the transmission of a compressed air control signal SM1 and a cleaning fluid control signal SM2. A compressed air source 314 and a fluid tank 316 are also connected to the cleaning device 318 in a fluid transferring manner via a medium line 312. Alternatively or additionally, the control unit 900 can also be directly connected to the compressed air source 314 in a signal transferring manner via a further control line 340 for the transmission of the compressed air control signal SM1. Alternatively or additionally, the control unit 900 can also be directly connected to the fluid tank 316 in a signal transferring manner via yet another control line 342 for transmitting the cleaning fluid control signal SM2.

The cleaning device 318 has a nozzle 320 for applying an amount of compressed air M1 and/or an amount of cleaning fluid M2 to a sensor surface 300 of the sensor 301 for cleaning.

The fluid tank 316 can be used for other vehicle functions, for example for supplying a windscreen cleaning system 920 or a similar, further cleaning system 220.

The control unit 900 can be connected to a rain sensor 330 in a signal transferring manner in optional embodiments.

The sensor 301 is connected to the control unit 900 in a signal transferring manner via a sensor line 902, in particular for the transmission of an air cleaning result LRE and/or a hybrid cleaning result HRE and/or an initial cleaning result IRE.

Figure 6:
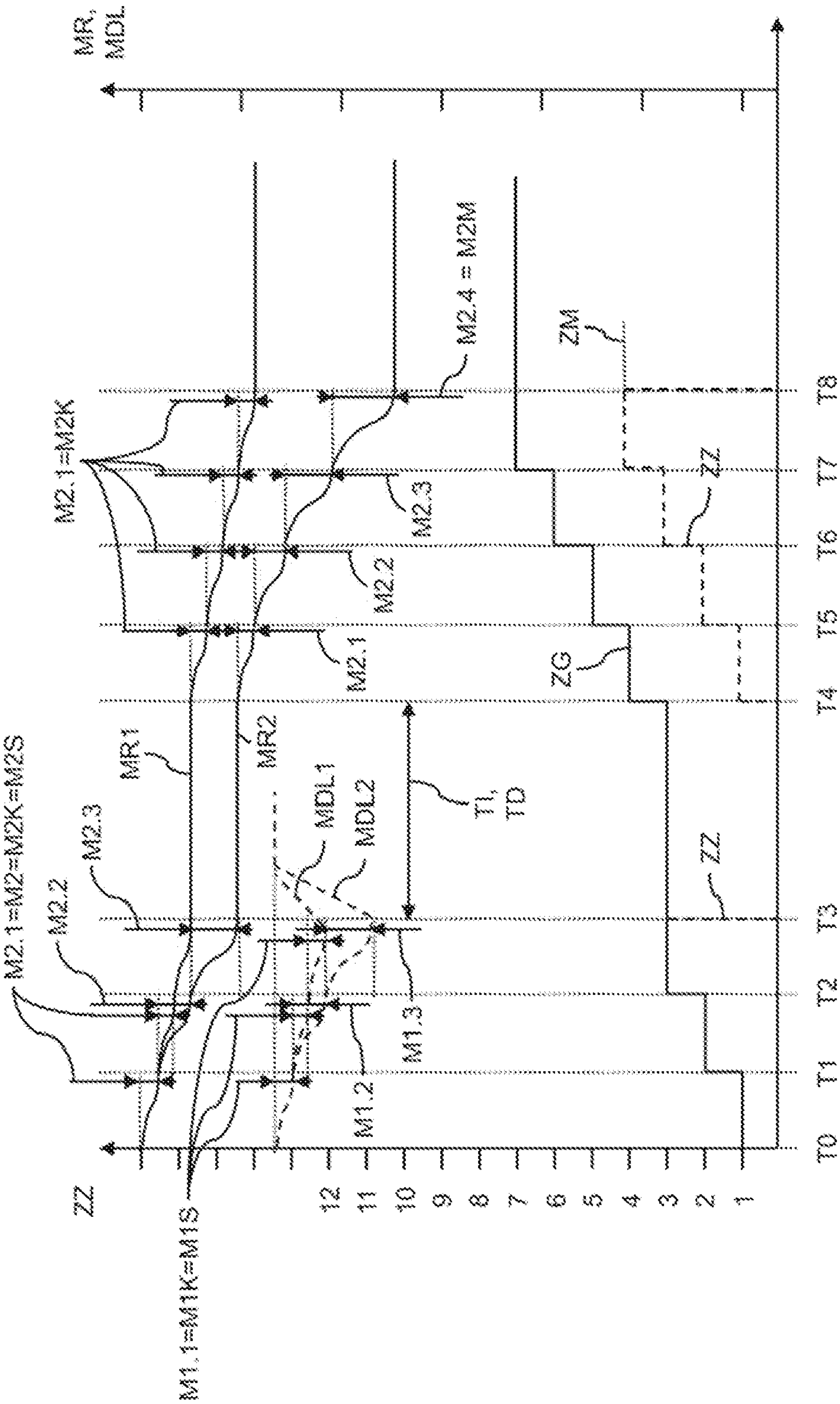

FIG. 6 shows a schematic profile of amounts of residual fluid MR1, MR2 and numbers of cycles ZZ, ZG against different points in time T0 to T8 for two embodiments of a procedure. At an initial time T0, a fluid tank 316 which is not shown here is fully filled, whereby a first residual amount of fluid MR1 is at a maximum for a first embodiment of the procedure. A first fluid cleaning step 414 is performed, in particular within the framework of a sequence of steps 440, in which a first amount of cleaning fluid M2.1 is consumed, whereby the first residual amount of fluid MR1 is reduced by the corresponding amount. In the first embodiment shown, the amount of cleaning fluid M2 is a constant amount of cleaning fluid M2K, that is, it remains constant regardless of the number of cycles ZZ. In the course of a cleaning method 400, which is not shown in more detail here, a further fluid cleaning step 414 is performed at a first time T1 and at a second time T2, in particular due to a negative hybrid cleaning result HRE, in each case a further, constant amount of cleaning fluid M2K is consumed and the first residual amount of fluid MR1 is gradually reduced accordingly. At the same time, the number of cycles ZZ is increased by the number 1 with each fluid cleaning step within a performance of the method. At a third point in time T3, the performance of the method is terminated, in particular due to a positive hybrid cleaning result HRE, whereby the first residual amount of fluid MR1 initially remains constant and the number of cycles ZZ is set back to zero. The total number of cycles ZG, on the other hand, remains constant at the value 3.

After a time interval TI between two performances of the cleaning method, which in the present case also corresponds by way of example to an average time interval TD between two performances of the cleaning method, a new performance of the cleaning method takes place at a fourth time T4. When the cleaning method is performed again, the first residual amount of fluid MR1 is reduced by the constant amount of cleaning fluid M2K in each of four fluid cleaning steps 414 and the number of cycles ZZ is again increased by 1 from 0 in each fluid cleaning step 414. At an eighth point in time T8, the method is terminated due to reaching a maximum value ZM of the number of cycles ZZ. In the present case, the maximum value ZM is equal to 4. The total number of cycles ZG is further increased by the number 4 to the value 7 based on the value 3 achieved in the previous performance.

In a second embodiment of the method shown here, the profile of a second residual amount of fluid of MR2 is shown. In contrast to the first embodiment shown with the first residual amount of fluid MR1, in the second, alternatively possible embodiment of the method, the amount of cleaning fluid M2 is not constant, but depends on the number of cycles ZZ. At an initial time T0, a first amount of cleaning fluid M2.1 corresponds to a starting amount of cleaning fluid M2S, which in the present case corresponds simultaneously to the constant amount of cleaning fluid M2K but may nevertheless also deviate from this.

In the second performance of the fluid cleaning step 414 at the first time T1, the number of cycles ZZ is already 1, whereby the amount of cleaning fluid is increased to a second amount of cleaning fluid M2.2. In the present case, the second amount of cleaning fluid M2.2 is increased by the amount of the first amount of cleaning fluid M2.1, that is, doubled, whereby the second residual amount of fluid MR2 is reduced accordingly by twice the amount. Analogously, in a third performance of the fluid cleaning step 414 at a second time T2—the number of cycles ZZ has been increased again by 1 to the number 2 at this time—the amount of cleaning fluid M2 is increased to a third amount of cleaning fluid M2.3—again by the first amount of cleaning fluid M2.1. The second residual amount of fluid MR2 is reduced accordingly by the third amount of cleaning fluid M2.3.

At the fourth time T4, a new performance of the method takes place by increasing the amount of cleaning fluid M2 in an analogous manner in four consecutive fluid cleaning steps 414 from a first amount of cleaning fluid M2.1 to a fourth amount of cleaning fluid M2.4 depending on the number of cycles ZZ. On reaching the fourth amount of cleaning fluid M2.4, a maximum amount of cleaning fluid M2M is reached, whereby—within this performance of the method—no further increase in the amount of cleaning fluid M2 takes place. This means that if from this, in this case fourth, fluid cleaning step 414 further fluid cleaning steps 414 are performed, these would also be performed with the fourth amount of cleaning fluid M2.4. In the present case, however, the maximum value ZM of the number of cycles ZZ is reached at the same time, whereby a termination condition is reached and the performance of the method is terminated.

Furthermore, in FIG. 6, by way of example, the profile of two total amounts of compressed air, namely a first total amount of compressed air MDL1 and a second total amount of compressed air MDL2, is shown dashed. The first profile of the total amount of compressed air MDL1 represents the profile in an embodiment of the method with a constant amount of compressed air M1K. Starting from the initial time T0, a first amount of compressed air M1.1 is output in three cleaning cycles as a constant amount of compressed air M1K. In particular, the respective amount of compressed air M1.1 is output to the sensor surface in a cleaning cycle after a corresponding amount of cleaning fluid M2. At the third time T3 there is no more application of compressed air, in particular due to a positive hybrid cleaning result HRE, or because a maximum value ZM of the number of cycles ZZ is reached. Subsequently, the first total amount of compressed air MDL1, which corresponds in particular to an amount of compressed air in a piston unit or in a compressed air reservoir of the compressed air source, is increased again to an initial level, in particular by filling the piston unit and/or operating a compressor of the compressed air source again. In particular, in contrast to a residual amount of fluid MR1, MR2, the supply of compressed air can be replenished during the operation of the vehicle.

As a second example of an increase in the amount of compressed air as a function of the number of cycles ZZ, the profile of the second total amount of compressed air MDL2 is shown. In this profile—analogous to the profile of the residual amount of fluid MR2—the amount of compressed air is increased from a first amount of compressed air M 1.1 as the starting amount of compressed air M1S at the initial time T0, via a second amount of compressed air M1.2 at the first time T1, to a third amount of compressed air M1.3 at the second time T2. At the third time T3 no further application of compressed air takes place, and the total amount of compressed air MDL2 is increased again to an initial level, in particular by filling the piston unit and/or operating a compressor.

It is understood that the foregoing description is that of the preferred embodiments of the invention and that various changes and modifications may be made thereto without departing from the spirit and scope of the invention as defined in the appended claims.

REFERENCE CHARACTER LIST (PART OF THE DESCRIPTION)

100 Cleaning system
220 Further cleaning system
300 Sensor surface
301 Sensor
302 Optical sensor
304 Camera
310 Dirt, fouling
312 Medium line
312.1, 312.2 First, second medium line
314 Compressed air source
315 Cleaning fluid source
316 Fluid tank
318, 318' Cleaning device
320 Nozzle
320.1, 320.2 First, second nozzle
322, 322' Piston unit
323 Venturi unit
324 Fluid valve
325 Restoring spring
326 Application module
327 Pressure ram
328 Combination unit
330 Rain sensor
332 Fluid line
334 Fluid valve
336 Pressure port
337 Fluid port
338, 338' Compressed air valve
338.1 to 338.3 First to third compressed air valve port
340 Further control line
342 Yet another control line
344, 344' Piston unit line
346 Level sensor
348 Sensor evaluation device
349 Setpoint-actual comparison module
349.1 Brightness comparison module
349.2 Camera image comparison module
349.3 Contrast comparison module
350 Setpoint-actual comparison
360 Thermometer
361 External thermometer
362 Windscreen wiper control unit
364 Windscreen heating control unit
366 Rear screen heating control unit
368 Anti-lock braking system (ABS) control unit
370 Control unit for electronic stability control (ESP)
380 Check valve
382 3/2-way valve
384 Ventilation line
386 Fluid check valve
400 Method
402 Starting step
410 Initial checking step
412 Air cleaning step
413 Checking step
414 Fluid, in particular liquid, cleaning step
416 Further air cleaning step
417 Further checking step
418 Counting step
420 Error step
422 Emergency operation step
424 Termination step
430 Hybrid cleaning step
440 Sequence of steps
442 Additional air cleaning process
444 Additional air cleaning step
446 Additional checking step
448 Additional counting step
900 Control unit
902 Sensor line
903 Evaluation line
904 Control line
906 System line
910 Program memory
912 Environment determination unit
920 Screen cleaning system
930 Further sensor
932 Further camera
940 Reference memory
950 Trigger switch
952 Communication interface
954 Vehicle bus
956 Wireless communication device
1000 Vehicle
1001 Autonomous vehicle
1010 Vehicle controller
1020 Vehicle control line
AB Termination condition
AB1 First termination condition
AB2 Second termination condition
AB3 Third termination condition
IRE Initial cleaning result
LRE Air cleaning result
HRE Hybrid cleaning result
HW Brightness value
HWA Brightness deviation
HWD Average brightness value
HWDV Average comparison brightness value
M1 Amount of compressed air
M1.1 to M1.3 First to fourth amount of compressed air
M1K Constant amount of compressed air
M1M Maximum amount of compressed air
M1S Starting amount of compressed air
M1Z Additional amount of compressed air
M2 Amount of Cleaning fluid
M2.1 to M2.4 First to fourth amount of cleaning fluid
M2K Constant amount of cleaning fluid
M2M Maximum amount of cleaning fluid M2S Starting amount of cleaning fluid
MDL Total amount of compressed air
MDL1, MDL2 First, second total amount of compressed air
MG Cleaning mixture
MR Residual amount of fluid
MR1, MR2 First, second residual amount of fluid
PX Pixel
RE Cleaning result
SC Cleaning signal
SI Sensor signal
SIK Camera signal, camera image
SIR Reference sensor signal
SIV Comparison sensor signal
SIKV Comparison camera signal, comparison camera image
SM1 Compressed air control signal
SM2 Cleaning fluid control signal
SR Rain signal
SSI Actual signal
SSS Setpoint signal
SU Environment signal
T0 Initial time
T1 to T8 First to eighth time
TB Subregion
TB2 Further subregion
TD Average time interval between two performances of the cleaning method
TI Time interval between two performances of the cleaning method
TR Remaining operating time
TW Waiting time
UZ Time
V1 to V7 First to seventh branch
VT Tank volume
ZM Maximal value of the number of cycles
ZG Total number of cycles
ZZ Number of cycles
ZZM Additional maximum value
ZZZ Additional number of cycles

What is claimed is:

1. A method for operating a cleaning system for cleaning a sensor surface of a sensor of a vehicle, the method comprising:
- applying an amount of compressed air to the sensor surface in an air cleaning step;
- checking an air cleaning result in a checking step; and,
- performing a hybrid cleaning step in an event of a negative air cleaning result, wherein said hybrid cleaning step includes at least one of:
- applying an amount of cleaning fluid to the sensor surface in a number of one or more cycles of a fluid cleaning step and recording the number of said cycles;
- applying an amount of compressed air to the sensor surface in a further air cleaning step;
- wherein the amount of cleaning fluid is determined using the number of said cycles as an input parameter such that a larger number of said cycles leads to a greater amount of cleaning fluid imparted to said surface of the sensor;
- wherein the amount of compressed air applied to the sensor surface in the air cleaning step depends on the number of cycles such that a larger number of cycles leads to a greater amount of compressed air being applied in succeeding cycles,
- wherein the amount of compressed air is increased up to a maximum amount of compressed air.

2. The method of claim 1, wherein said further air cleaning step is performed after said fluid cleaning step is performed.

3. The method of claim 1, wherein said recording the number of said cycles comprises increasing the number of said cycles by 1 after each of said fluid cleaning steps.

4. The method of claim 3, wherein the amount of cleaning fluid is increased up to a maximum amount of cleaning fluid.

5. The method of claim 1, wherein a sequence of steps includes said hybrid cleaning step and a further checking step wherein a hybrid cleaning result is checked after said hybrid cleaning step; and, the sequence of steps is repeated until a termination condition is reached.

6. The method of claim 5, wherein the termination condition is reached, if as a first termination condition, the hybrid cleaning result is positive or as a second termination condition a number of cycles has reached a maximum value.

7. The method of claim 5, wherein at least one of said checking step for checking the air cleaning result and said further checking step for checking the hybrid cleaning result is performed by at least one of the sensor and an evaluation device having the sensor.

8. The method of claim 5, wherein said checking step or said further checking step is performed during said air cleaning step or said further air cleaning step; or within a waiting time after the air cleaning step or the further air cleaning step.

9. The method of claim 8, wherein the waiting time is 500 milliseconds.

10. The method of claim 1, wherein the air cleaning step is performed in an event of a negative initial cleaning result of an initial checking step.

11. The method of claim 1, wherein the air cleaning step is performed in an event of a positive rain signal of a rain sensor.

12. The method of claim 1, further comprising determining at least one of a residual amount of fluid and a remaining operating time of the cleaning system, wherein said determination is performed on a basis of a residual number of cycles or a total number of cycles.

13. The method of claim 1, further comprising:
- after said checking an air cleaning result in said checking step, in the event of said negative air cleaning result and ahead of performing said hybrid cleaning step, additionally performing an additional air cleaning procedure, said additional air cleaning procedure including:
- applying an additional amount of compressed air to the sensor surface in an additional air cleaning step, and,
- checking the air cleaning result in an additional checking step.

14. The method of claim 13, wherein said additional air cleaning procedure is repeated until at least one of the air cleaning result is positive and an additional termination condition is reached.

15. The method of claim 1, wherein at least one of a cleaning signal and the air cleaning result is formed in dependence upon a setpoint-actual comparison between an actual signal and a setpoint signal.

16. The method of claim 5, wherein at least one of a cleaning signal, the air cleaning result, and the hybrid cleaning result is formed in dependence upon a setpoint-actual comparison between an actual signal and a setpoint signal.

17. The method of claim 10, wherein at least one of a cleaning signal, the negative initial cleaning result, and the air cleaning result is formed in dependence upon a setpoint-actual comparison between an actual signal and a setpoint signal.

18. The method of claim 1, wherein at least one of a cleaning signal and the air cleaning result is formed in dependence upon on at least one of a brightness deviation and a contrast deviation.

19. The method of claim 15, wherein:

the actual signal is formed by a sensor signal; and, the setpoint signal is formed by at least one of a comparison sensor signal provided by at least one further sensor, and a reference sensor signal provided by a reference memory.

20. The method of claim 1, wherein said fluid cleaning step includes applying a liquid to the sensor surface.

21. The method of claim 1, wherein the sensor is an optical sensor.

22. A method for operating a cleaning system for cleaning a sensor surface of a sensor of a vehicle, the method comprising:

applying an amount of compressed air to the sensor surface in an air cleaning step;

checking an air cleaning result in a checking step; and, performing a hybrid cleaning step in an event of a negative air cleaning result, wherein said hybrid cleaning step comprises:

(A) applying an amount of cleaning fluid to the sensor surface in a fluid cleaning step; then (B) applying an amount of compressed air to the sensor surface in a further air cleaning step; and then (C) checking a hybrid cleaning result; and repeating the hybrid cleaning step until a termination condition is reached, wherein the amount of cleaning fluid is determined using a number of cycles of said hybrid cleaning step as an input parameter, and wherein the termination condition is reached, if (a) as a first termination condition, the hybrid cleaning result is positive or (b) as a second termination condition, a number of times that the hybrid cleaning step is performed has reached a maximum value.

23. The method of claim 1, wherein the amount of cleaning fluid varies across a plurality of successive cycles according to a linear progression.

24. The method of claim 1, wherein the amount of cleaning fluid varies across a plurality of successive cycles according to a nonlinear progression.

* * * * *